(12) United States Patent
Yoshida et al.

(10) Patent No.: US 7,136,208 B2
(45) Date of Patent: Nov. 14, 2006

(54) LIGHT SCANNING APPARATUS AND IMAGE FORMING APPARATUS USING THE SAME

(75) Inventors: Hiroki Yoshida, Utsunomiya (JP); Yoshihiro Ishibe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/258,198

(22) Filed: Oct. 26, 2005

(65) Prior Publication Data

US 2006/0091306 A1    May 4, 2006

(30) Foreign Application Priority Data

Nov. 1, 2004    (JP)    ............... 2004-318198

(51) Int. Cl.
G02B 26/08    (2006.01)
(52) U.S. Cl. ............. 359/205; 359/204; 359/216; 347/232; 347/233; 347/244; 347/259
(58) Field of Classification Search .......... None
See application file for complete search history.

(56) References Cited

U.S. PATENT DOCUMENTS 6,067,106 A    5/2000    Ishibe et al.

6,643,043 B1 *    11/2003    Kato ............... 359/206

FOREIGN PATENT DOCUMENTS

JP    9-54263    2/1997
JP    10-333070    12/1998

* cited by examiner

Primary Examiner—James Phan
(74) Attorney, Agent, or Firm—Fitzpatrick, Cella, Harper & Scinto (57) ABSTRACT

A light scanning apparatus capable of printing with a high quality and an image forming apparatus using the same are obtained. The light scanning apparatus is provided with an incidence optical system for guiding a light beam emitted from a light source part to a deflection part; an imaging optical system provided with a diffracting surface having a power at least in a sub-scanning section that guides the light beam deflected by the deflection part on a surface to be scanned; and a surface inclination correction function, in which a principal ray of the light beam is always positioned outside of a main scanning section during scanning. In the light scanning apparatus, each element is set so as to satisfy each conditional expression.

11 Claims, 6 Drawing Sheets

LIGHT SCANNING APPARATUS AND IMAGE FORMING APPARATUS USING THE SAME

BACKGROUND OF THE INVENTION

1. Field of the Invention

The present invention relates to a light scanning apparatus and an image forming apparatus using the same.

More specifically, the present invention is suitable for an image forming apparatus such as a laser beam printer and a digital copying machine having an electrophotographic process in which image information is recorded by carrying out light scanning on a surface to be scanned with a light beam (laser beam) emitted from a light source means via an imaging optical system.

2. Related Background Art

Conventionally, as the light scanning apparatus used for the image forming apparatus, an optical system in which the light beam is made incident at an angle not orthogonal to a rotational axis of a deflection means (light deflection device) (diagonal incident light scanning apparatus) is known.

For example, in an over filled light scanning apparatus (OFS optical system), in many cases, the light beam is made incident on the light deflection device from a side of an imaging optical system (scanning lens system) in a sub-scanning direction with a certain angle so that a distribution of light amount is not asymmetrical in the left and the right.

Besides, in some cases of the light scanning apparatus having a smaller number of the light deflection devices than a number of the surfaces (photoconductive drum surfaces) to be scanned, a plurality of light beams is made incident on the light deflection device with different angles in the sub-scanning direction in order to separate the plurality of light beams deflected by the light deflection device.

In such a light scanning apparatus, it is difficult to always continue to make the light beam (ray) incident on the main scanning section including an optical axis of an optical surface provided to the imaging optical system.

This is because the light beam deflected by the light deflection device changes an advancing direction of the light beam in a cone-like shape. In addition, because a scanning line curvature occurs in accordance with the change in the advancing direction of the light beam, conventionally, the scanning line curvature is alleviated by positively decentering the optical surface.

Besides, in recent years, various types of the light scanning apparatuses provided with the imaging optical system and the like having a diffracting surface in order to carry out a temperature compensation are proposed. The light scanning apparatus like this is in the power arrangement in which the fluctuation of a positive refractive power at the time of fluctuation of an environmental temperature is set off by the fluctuation of a positive diffraction power at the time of the fluctuation of the environmental temperature (Japanese Patent Application Laid-open No. H10-333070 (U.S. Pat. No. 6,067,106)).

In such a light scanning apparatus, an imaging position is deviated in a direction of the optical axis when a wavelength is fluctuated by a mode hop (mode hopping) regardless of the environmental temperature.

Because of this, it is necessary to sufficiently secure a tolerable depth width. The light scanning apparatus in which the tolerable depth width is sufficiently secured is proposed (Japanese Patent Application Laid-open No. H09-054263 (no corresponding foreign patent application made)).

Incidentally, in the light scanning apparatus in which the imaging optical system is provided with the diffracting surface, if an optical element that configures the imaging optical system is decentered in a sub-scanning direction, when the wavelength of the light emitted from a light source is fluctuated, the imaging position is deviated in the sub-scanning direction, as well as in the optical axis direction.

Because of this, there arises a problem such that if the mode hop occurs during the scanning (while forming an image on the surface to be scanned by the light beam emitted from the light source means), image quality is deteriorated because of fluctuation of a scanning line interval before and after the occurrence of the mode hop.

Especially, in a color image forming apparatus, it is especially necessary to alleviate a positional displacement of the scanning line because the occurrence of the mode hop causes a color drift.

SUMMARY OF THE INVENTION

An object of the present invention is to provide a light scanning apparatus capable of carrying out a high quality printing and the image forming apparatus using the same.

The present invention provides a light scanning apparatus including: an incidence optical system for guiding a light beam emitted from a light source means to a deflection means; and an imaging optical system for guiding the light beam reflected on the deflection means on a surface to be scanned, which has at least one diffracting surface having a power in a sub-scanning section; in which the deflecting surface of the deflection means and the surface to be scanned are conjugated with each other; in which in the sub-scanning section, a principal ray of the light beam reflected by the deflection means passes through the outside of an optical axis of the diffracting surface; and in which, letting $\beta$ be a transversal magnification ratio of the imaging optical system in the sub-scanning section, f [mm] be a focal length of the imaging optical system in the sub-scanning section, $\delta f$ [mm] be an amount of variance of the focal length of the imaging optical system in the sub-scanning section when a wavelength of the light beam emitted from the light source means is varied by 1 nm, h [mm] be a distance between the principal ray and the optical axis of the diffracting surface in the sub-scanning section on the diffracting surface, and R [dot/inch] be a resolution, a following condition is satisfied:

$$|(1-\beta) \cdot (\delta f/f) \cdot h| < \{25.4/R\}/2, \ |h| > 0.$$

According to the present invention, the light scanning apparatus includes the imaging optical system provided with the diffracting surface having the power in the sub-scanning section, in which the deflecting surface of the deflection means is conjugated with the surface to be scanned in the sub-scanning section. Besides, it is possible to alleviate the displacement of height of the scanning line occurring due to the mode hop by appropriately setting each of the elements that configures the light scanning apparatus. Thereby the light scanning apparatus capable of printing at a high speed and with a high quality and the image forming apparatus using the same can be achieved.

DESCRIPTION OF THE PREFERRED EMBODIMENTS

In the present invention, a distance between a principal ray of a light beam on a diffracting surface and an optical axis of the diffracting surface in a sub-scanning section (height of the ray) is defined as h.

To begin with, a principle for achieving an object of the present invention is explained with reference to FIG. 9.

Figure 9:
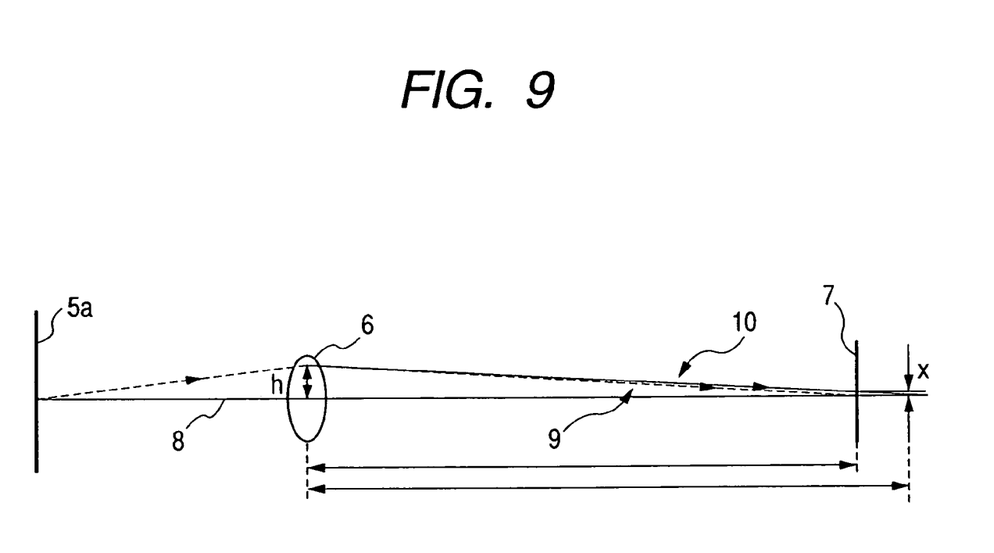
FIG. 9 is a sub-scanning sectional view of the light scanning apparatus that explains a principle of the present invention.

FIG. 9 is a cross section of an essential portion in a sub-scanning direction (sub-scanning cross section) which schematically shows an optical path after a light beam is deflected by a deflection means (light deflection device).

In FIG. 9, reference numeral 5a denotes a deflecting surface provided to a light deflection device, reference numeral 6 denotes an imaging optical system (scanning lens system) provided with the diffracting surface having a positive diffraction power (power generated by diffraction) in the sub-scanning section, reference numeral 7 denotes a surface to be scanned, reference numeral 8 denotes the optical axis of the imaging optical system 6, a broken line 9 denotes the optical path of a principal ray before a wavelength of the light flux deflected on the deflecting surface 5a is fluctuated, and a full line 10 denotes the optical path of the principal ray after the wavelength of the light flux deflected on the deflecting surface 5a is fluctuated.

Note that in this specification, the principal ray refers to a central ray of the light beam or the ray passing through the center of an aperture stop.

As shown in FIG. 9, when the ray (principal ray) passes through a point distant from the optical axis 8 of the imaging optical system 6 by the distance h, if the imaging optical system is provided with an image inclination correction function, the ray passes through the optical path indicated by the broken line 9 and comes back again on the optical axis 8.

However, when the wavelength is fluctuated, the positive diffraction power, especially, is fluctuated. Therefore, the ray passes through the optical path as indicated by the full line 10, for example, and the image of the ray is formed at a position distant from the surface to be scanned 7.

Because of this, on the surface to be scanned 7, the ray passes through the position distant from the optical axis 8 by a height x. Therefore, a position of a scanning line is deviated by the distance x.

Let f [mm] be a focal length of the imaging optical system 6 in the sub-scanning section before a mode hop, and β be a transversal magnification ratio of the imaging optical system 6 in the sub-scanning section (hereinafter also referred to as a "transversal magnification ratio in the sub-scanning direction").

Besides, let f+df [mm] be the focal length of the imaging optical system 6 in the sub-scanning section after the mode hop, and β' be a transversal magnification ratio of the imaging optical system 6 in the sub-scanning section.

Then the distance from a principal plane on the side of the image of the imaging optical system 6 to an imaging point is fluctuated from $(1-\beta)f$ to $(1-\beta')(f+df)$ before and after the mode hop. Note that in FIG. 9, $\beta<0$ and $\beta'<0$.

Because a positional relationship between the deflecting surface 5a of a light deflection device 5 and the imaging optical system 6 does not change before and after the mode hop, the scanning line positional displacement x can be expressed by an equation $$x = h(1-\beta/\beta')$$

where h [mm] is a position through which the ray passes on the principal plane on the imaging side of the imaging optical system 6 in the sub-scanning section (a height of the ray at the time of incidence on the diffracting surface of the principal ray with the optical axis of the diffracting surface as the reference). After substituting with $-\beta' = (f+df)/\{f/(-\beta)-df\}$, and by rearranging the above equation after the substitution, an equation $$x = h\,df(1-\beta)/(f+df)$$

is obtained. Then, the equation can be expressed, by approximation, by an expression $$x \approx (1-\beta)\cdot(df/f)\cdot h.$$

The inventor of the present invention finds that it is necessary to limit the scanning line positional displacement |x| to be half or less of a scanning line interval because when the scanning line positional displacement occurs, if the displacement occurs by half or more of the scanning line interval, a printing quality is extremely deteriorated.

Now, letting R [dot/inch] be a resolution, the scanning line interval is 25.4/R mm. In addition, because a fluctuation of the wavelength by about 1 nm due to the mode hop is highly possible, it is necessary to configure the light scanning apparatus so that a relational equation $$|x| \approx |(1-\beta)\cdot(\delta f/f)\cdot h| < \{25.4/R\}/2,\ h \neq 0 \quad (1)$$

is satisfied, where δf is an amount of fluctuation of the focal distance of the imaging optical system 6 in the sub-scanning section when the wavelength is fluctuated by 1 nm.

In the present invention, it is preferable that a value of the height h of the ray satisfies a condition of $|h|<4.8$. This is because if the value of the height h of the ray exceeds an upper limit of the condition, a spot is rotated, and as a result, a printing performance is deteriorated.

In addition, it is preferable that the transversal magnification ratio β in the sub-scanning direction satisfies a condition $0.8 \leq \beta \leq 3.5$.

If the transversal magnification ratio β in the sub-scanning direction is below a lower limit of the condition, a length of a lens in a main scanning direction needs to be lengthened, and therefore there arises a problem that a cost of the lens becomes expensive.

Besides, if the transversal magnification ratio β in the sub-scanning direction exceeds an upper limit of the condition, the transversal magnification ratio β in the sub-scanning direction becomes excessively high, and as a result, a displacement of the printing position in the sub-scanning direction occurring due to eccentricity can remarkably and easily occur.

[Temperature Compensation at a Focusing Position]

Hereinbelow, examination is made especially as to a case where a temperature compensation at a focusing position in the sub-scanning section in the imaging optical system 6.

In order to carry out the temperature compensation at a focusing position in the sub-scanning section in the imaging optical system 6, it is necessary that a ratio of a refractive power to the diffraction power of the imaging optical system 6 is at a certain ratio.

The power of the whole system of the imaging optical system 6 is set to be positive. This is because it is necessary to make an image of the light beam formed on the surface to be scanned 7.

In order to carry out the temperature compensation at a focusing position in the sub-scanning section, it is necessary that the refractive power $\phi r$ and the diffraction power $\phi d$ are given the same sign. Therefore, both the refractive power $\phi r$ and the diffraction power $\phi d$ are the positive powers. For the details of this, refer to Japanese Patent Application Laid-open No. 10-333070 (U.S. Pat. No. 6,067,106).

Now, where a total power of the refractive power $\phi r$ and the diffraction power $\phi d$ in the sub-scanning section is $\phi a$, a wavelength of the light beam is $\lambda$, a refractive index of a material of the lens of the imaging optical system 6 is n, a sensitivity of $\phi a$, $\lambda$, and n with respect to a temperature T is $d\phi a/dT$, $d\lambda/dT$, $dn/dT$, respectively, a relational equation $$d\phi a/dT = (\phi d/\lambda) \cdot (d\lambda/dT) + \{\phi r/(n-1)\} \cdot (dn/dT)$$

holds.

Suppose $\lambda = 780 \times 10^{-6}$ [mm], n=1.5242, $d\lambda/dT = 0.255 \times 10^{-6}$ [mm/° C.], and $dn/dT = -0.85 \times 10^{-4}$ [/° C.], then $$d\phi a/dT = 3.269 \times 10^{-4} \phi d - 1.622 \times 10^{-4} \phi r.$$

In order to carry out the temperature compensation, it is sufficient that $d\phi a/dt = 0$, then a relationship $$\phi r \approx 2.016 \phi d$$

is derived.

In addition, the amount of fluctuation $d\phi a$ of the total power $\phi a$ after the wavelength is fluctuated is, when the diffraction power is $\phi d$, $$d\phi a = \phi d \cdot d\lambda/\lambda.$$

From this relational equation, a ratio $\delta f/f$ of the focal length f of the imaging optical system 6 in the sub-scanning section to the amount of fluctuation $\delta f$ of the focal length of the imaging optical system 6 in the sub-scanning section when the wavelength is fluctuated by 1 nm is expressed by a relational equation $$\delta f/f = 1/(1+\phi d/\phi a \cdot d\lambda/\lambda) - 1.$$

By approximation, the relational equation can be expressed by an expression $$\delta f/f \approx -\phi d/\phi a \cdot d\lambda/\lambda.$$

Besides, from the relationship between the diffraction power $\phi d$ and the refractive power $\phi r$ in a temperature compensation system, an equation $$\phi a = \phi d + \phi r = 3.016 \ \phi d$$

holds. Further, when $\lambda = 780$ [nm] and the fluctuation of the wavelength by the mode hop is 1 nm, a relational equation $$\delta f/f = -4.251 \times 10^{-4}$$

is derived. Therefore, it is necessary to configure the light scanning apparatus so that the scanning line positional displacement x, which is set in order not to extremely deteriorate the printing quality at the time of the temperature compensation, satisfies an expression $$|x| \approx 4.251 \times 10^{-4} \times |(1-\beta) \cdot h| < \{25.4/R\}/2, \ h \neq 0 \quad (2).$$

Hereinafter, embodiments of the present invention are explained with reference to the drawings.

First Embodiment

Figure 1:
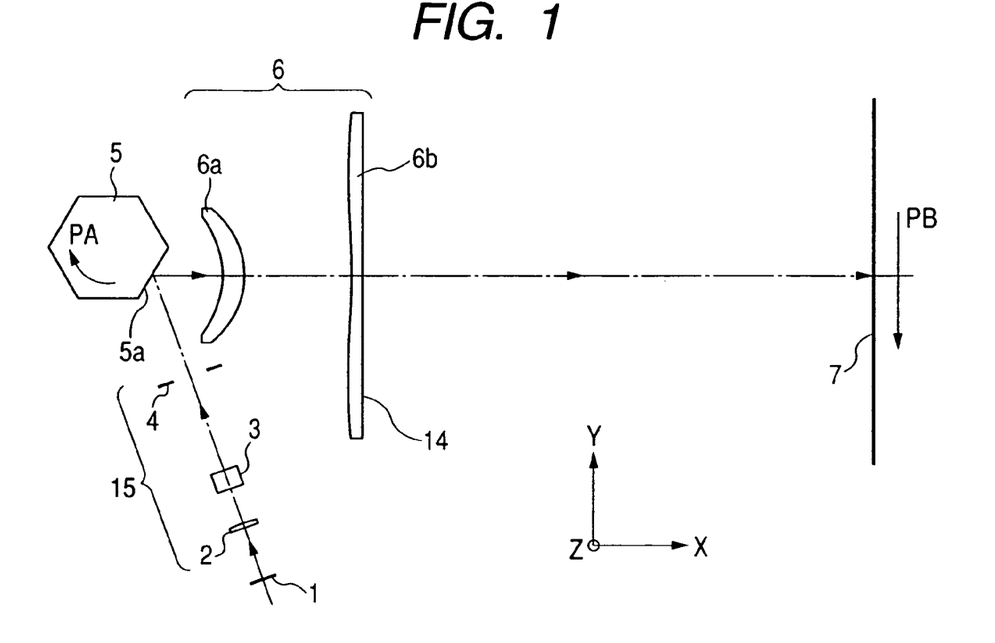
FIG. 1 is a main scanning sectional view of a first embodiment of the present invention.
Figure 2:
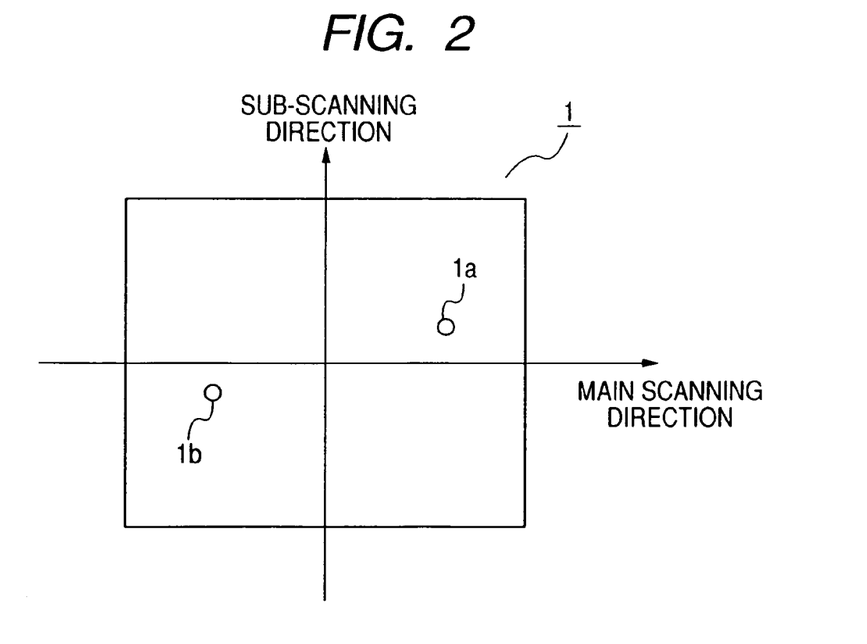
FIG. 2 is a view showing a positional relationship of a light emitting section of a light source means as shown in FIG. 1.

FIG. 1 is a cross sectional view of an essential portion of the light scanning apparatus of the first embodiment of the present invention in the main scanning direction (main scanning sectional view), and FIG. 2 is a view explaining the positional relationship between light emitting sections (light emitting points) 1a and 1b of the light source means as shown in FIG. 1.

Here, the main scanning direction refers as a direction orthogonal to a rotational axis of the deflection means (a direction in which the light beam is reflectively deflected (deflectively scanned) by the deflection means), and the sub-scanning direction refers as a direction parallel to the rotational axis of the deflection means. Besides, the main scanning section refers as a plane that is parallel to the main scanning direction and includes an optical axis of the diffracting surface. In addition, the sub-scanning section refers as the section orthogonal to the main scanning section.

In FIG. 1, reference numeral 1 denotes a light source means. The light source means 1 is configured by a monolithic 2-beam laser having two light emitting sections 1a and 1b.

The two light emitting sections 1a and 1b are, as shown in FIG. 2, disposed separately from each other with respect to the main scanning direction and the sub-scanning direction. The distance between the light emitting sections is longer in the main scanning direction than in the sub-scanning direction.

This configuration is employed because it is possible to set the distance between the light emitting sections in the sub-scanning direction to a desired value by rotating the light source means 1.

In addition, the displacement of the scanning line interval (positional displacement of the scanning line in the sub-scanning direction) occurring due to a difference in the wavelength of two light beams emitted from each of the light emitting sections 1a and 1b in an initial state is adjusted by rotating the light source means 1 around the optical axis.

Note that the number of the light emitting section is not limited to two, and may be three, four, or more as may be necessary. Needless to say, the number of the light emitting section may be one.

Reference numeral 2 denotes a collimator lens (condensing lens). The collimator lens 2 converts two light beams emitted from the light source means 1 into nearly parallel light beams. Reference numeral 3 denotes a cylindrical lens (optical system). The cylindrical lens 3 has a prescribed refractive power only in the sub-scanning direction. Reference numeral 4 is an aperture stop. The aperture stop 4 shapes the two light beams emitted from the cylindrical lens 3 into the light beams of a desired optimum shape.

In the first embodiment, a deflection point (a point at which the ray passing through the center of the aperture stop 4 is deflectively reflected on the deflecting surface 5a) of the two light beams are made close to each other by disposing the aperture stop 4 close to the deflecting surface 5a of the light deflection device 5 to be described later, and thereby a positional displacement of a dot of an imaging spot in the main scanning direction (jitter in the main scanning direction) is alleviated.

Note that each of the elements of the collimator lens 2, the cylindrical lens 3, the aperture stop 4, and the like is one of the elements of an incident optical system 15.

Reference numeral 5 is a light deflection device that is a deflection means. The light deflection device 5 is configured by a rotary polygon mirror (polygon mirror), for example, and is rotated at a constant speed in a direction of an arrow PA in FIG. 1 by a driving means (not shown) such as a motor.

Reference numeral 6 denotes an imaging optical system having fθ characteristics. The imaging optical system 6 is provided with two scanning optical elements (fθ lenses) of a first scanning optical element 6a and a second scanning optical element 6b, in order from a side of the light deflection device. Besides, the imaging optical system 6 forms a spot-like image of each of the two light beams deflected by the light deflection device 5 on the photoconductive drum surface 7 that is the surface to be scanned, and forms two scanning lines at the same time.

In the first embodiment, the magnification ratio in the sub-scanning section is reduced by providing the second scanning optical element 6b with the power (refractive power) in the sub-scanning section with respect to the first scanning optical element 6a, and thereby rising of the sensitivity is suppressed.

In addition, the second scanning optical element 6b is provided with a diffracting surface 14 having the positive diffracting power in the sub-scanning section on a lens surface on the side of the surface to be scanned 7. Besides, the second scanning optical element 6b carries out a color compensation at the focusing position in the main scanning section and the temperature compensation at the focusing position in the sub-scanning section.

Of the first scanning optical element 6a and the second scanning optical element 6b, by providing the second scanning optical element 6b, which has strongest power in the sub-scanning section, with the diffracting surface 14, it is possible to dispose a surface on which the power is easiest to be fluctuated upon fluctuation of an environmental temperature and a surface on which the diffraction power is easiest to be fluctuated upon the fluctuation of the environmental temperature in the vicinity of each other.

Thus, fluctuation of the position of passage of the light beam occurring due to the fluctuation of the environmental temperature in the sub-scanning section is alleviated, and thereby another occurrence of deterioration of optical performance is alleviated.

In addition, the imaging optical system 6 is provided with the image inclination correction function by conjugating the deflecting surface 5a of the light deflection device 5 with the photoconductive drum surface 7 in the sub-scanning section.

Reference numeral 7 denotes a photoconductive drum surface that is a surface to be scanned.

In the first embodiment, the two light beams that are light-modulated in accordance with image information and emitted from the light source means 1 are converted into parallel light beams by the collimator lens 2 and is made incident into the cylindrical lens 3.

The light beam incident into the cylindrical lens 3 is emitted as it is in the main scanning section and passes through the aperture stop 4 (and is partially shielded).

The light beam incident into the cylindrical lens 3 is, in the sub-scanning section, converged to pass through the aperture stop 4 (and is partially shielded) and the image of the light beam is formed as a linear image (the linear image long in the main scanning direction) on the deflecting surface 5a of the light deflection device 5.

Besides, the image of each of the two light beams reflected and deflected on the deflecting surface 5a of the light deflection device 5 is formed in a spot-like shape on the photoconductive drum surface 7 by the imaging optical system 6. In addition, light scanning is carried out at a constant speed on the photoconductive drum surface 7 in a direction of an arrow PB (main scanning direction) by rotating the light deflection device 5 in a direction of an arrow PA.

Thereby the two scanning lines are formed at the same time and image recording is carried out on the photoconductive drum surface 7 that is a recording medium.

Note that the light scanning apparatus according to the first embodiment is configured so that the principal ray Lp of the light beam emitted from the light emitting points 1a and 1b is constantly positioned outside of the main scanning section (outside of the optical axis of the diffracting surface) in the sub-scanning section during the scanning (while the image is being formed on the surface to be scanned 7 with the light beams emitted from the light source means 1).

Figure 3:
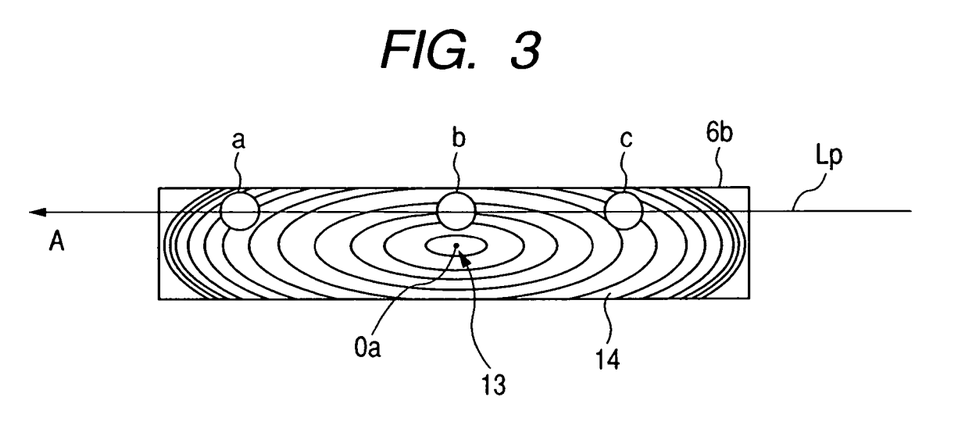
FIG. 3 is a view showing a positional relationship between a diffracting surface and a light beam according to the first embodiment of the present invention.

Here, FIG. 3 is a view explaining a positional relationship between the diffracting surface 14 and the light beams a, b, and c when the second scanning optical element 6b is viewed from the surface to be scanned 7.

The second scanning optical element 6b is a plastic mold lens in which the diffracting surface is integrally formed on the lens surface.

The shape of a generating line of the first imaging optical element 6a and the second imaging optical element 6b that are imaging lenses is expressed by a relational expression that $$X = \frac{R^2/Y}{1 + \sqrt{\{1-(1+k)*(R/Y)^2\}}} + \sum (ai*Y^i)$$

where Y is a coordinate in the main scanning direction, Y-coordinate on the lens optical axis is 0, the side of the light source means 1 is set as a plus direction and an opposite side of the light source means 1 is set as a minus direction; and X is a coordinate in the optical axis direction, X-coordinate on the axis is 0, the side of the surface to be scanned 7 is set as a plus direction and the side of the light deflection device 5 is set as a minus direction.

A radius of curvature r of a slave line section (sub-scanning section) of the imaging lens in this embodiment is fluctuated in accordance with the coordinate Y in the main scanning direction and is expressed by a following expression.

$$r = R\{1 + \Sigma(ai*Y^i)\}$$

where k and ai are aspherical coefficients.

A definitional equation of the diffracting surface 14 is as follows.

$$\Phi = \frac{2\pi}{\lambda} \sum_{i=}^{m} \sum_{j=}^{n} C_N z^{\wedge} i \; y^{\wedge} j$$

where $\Phi$ is a phase difference, $\lambda$ is a wavelength, Cn is a phase polynomial coefficient, y is a coordinate in the main scanning direction viewed from the optical axis, z is a coefficient in the sub-scanning direction viewed from the optical axis. The above expression expresses the phase at the coordinates y, z when the phase on the optical axis is set to be 0.

In FIG. 3, each ellipse represents a zone of the diffracting surface 14; and Oa represents the optical axis of the diffracting surface 14, and reference numeral 13 denotes a zeroth zone section (an elliptic portion having a relatively large area in the vicinity of the central portion of a mirror surface). Each of three circles a, b, and c denotes the light beam currently scanning. Lp denotes a principal ray of the light beam. In FIG. 3, each of the light beams a, b, and c currently scanning scans in a direction of a lateral arrow A.

In this embodiment, as shown in FIG. 3, the principal ray Lp of the light beam that passes through the second imaging optical element 6b passes through the outside of the zeroth zone section 13 of the diffracting surface 14 in the sub-scanning section.

In this regard, other zone sections are easy to work because fluctuation of a grating height with respect to a direction of radius is nearly linear, on the other hand, it is necessary to carry out a more difficult working for the zeroth zone section 13 because it is necessary to work the zeroth zone in a curved shape, and thus, this configuration is intended to avoid giving an unintended power and wavefront aberration to the light beam in a case where the light beam passes through the zeroth zone section 13.

In this case, the light beam passes through a position considerably distant in the sub-scanning direction from the optical axis Oa of the diffracting surface 14.

In the first embodiment, a width of the zeroth zone section 13 in the sub-scanning direction is 1.4 mm, a width of the light beam on the diffracting surface 14 is 4 mm, an amount of displacement of the passing position of the light beam occurring due to assembling tolerance is ±1 mm, and a height of the ray at the time of incidence on the diffracting surface 14 of the principal ray Lp with the optical axis of the diffracting surface 14 as the reference is represented as $h=3.7$ [mm].

In addition, in the light scanning apparatus according to the first embodiment, the wavelength $\lambda$ of the light beam is expressed by an expression $\lambda = 780 \times 10^{-6}$ [mm], the refractive index n of the material of the lens of each of the first imaging optical element 6a and the second imaging optical element 6b that configure the imaging optical system 6 is expressed by an expression $n=1.5242$, the sensitivity $d\lambda/dT$ and $dn/dT$ of the wavelength $\lambda$ and the refractive index n with respect to the temperature are expressed by expressions $d\lambda/dT=0.255\times10^{-6}$ [mm/° C.], and $dn/dT=-0.85\times10^{-4}$ [/° C.], respectively, the transversal magnification ratio $\beta$ of the imaging optical system 6 in the sub-scanning direction is expressed by an expression $\beta=-3$, and the resolution R is expressed by an expression $R=600$ [dot/inch].

Besides, in the first embodiment, the temperature compensation is carried out with respect to an inside of the sub-scanning section, and a conditional expression $$2.0 < \phi a/\phi d < 4.0 \qquad (3)$$

is satisfied where $\phi a$ [1/mm] is the total power of the imaging optical system 6 in the sub-scanning section and $\phi d$ [1/mm] is the power of diffraction in the sub-scanning section. Deviation from the conditional equation (3) leads to failure in the temperature compensation. Accordingly, such deviation is not preferable. Note that in this embodiment, $\phi a/\phi d = 3.016$, which satisfies the conditional equation (3).

Note that in this embodiment, the temperature compensation is of course carried out also in the main scanning section, as well as in the sub-scanning section.

In the first embodiment, the ratio $\delta f/f$ of the focal length of the imaging optical system 6 in the sub-scanning section to the amount of fluctuation $\delta f$ of the focal length f when the wavelength is fluctuated by +1 nm is, as described above, expressed by the expression $\delta f/f = -4.251 \times 10^{-4}$.

In the first embodiment, the displacement x of the height of the scanning line when the wavelength is fluctuated by 1 nm by the mode hop is expressed by an expression $x=(1-\beta)\cdot(\delta f/f)\cdot h = -6.29 \times 10^{-3}$ [mm].

That is, $|-6.29\times10^{-3}$ [mm]$|<\{25.4/R\}/2=21.1\times10^{-3}$ [mm].

This satisfies the conditional expressions (1) and (2) described above.

When a plurality of the light beams is used as in the first embodiment, if the mode hop occurs with respect only to some of the light beams, the scanning line intervals (positional displacement of the scanning line in the sub-scanning direction) become uneven. As a result, an image quality deteriorates more easily than in a case where a single light beam is used. Thus, in the case where a plurality of the light beams is used, it is necessary to control the displacement of the height of the scanning line more strictly than in the case where a single light beam is used.

In this regard, in the first embodiment, each element is set so as to satisfy conditional expressions (4) and (5) below, in order to limit the displacement x of the height of the scanning line occurring due to the mode hop to be equal to or smaller than one-quarter of the scanning line interval.

$$|(1-\beta)\cdot(\delta f/f)\cdot h| < \{25.4/R\}/4 \quad (4)$$

$$4.251\times10^{-4}\times|(1-\beta)\cdot h| < \{25.4/R\}/4 \quad (5)$$

More specifically, the scanning line interval d is, according to the expression $$R=600 \text{ [dot/inch]},$$

expressed by an expression $$d=25.4/R=42.3\times10^{-3} \text{ [mm]}.$$

In the first embodiment, the displacement x of the height of the scanning line when the wavelength is fluctuated by 1 nm due to the mode hop is, from the above expressions, expressed by an expression $$x=(1-\beta)\cdot(\delta f/f)\cdot h = -6.29\times10^{-3} \text{ [mm]}.$$

That is, $$|-6.29\times10^{-3} \text{ [mm]}| < \{25.4/R\}/4 = 10.6\times10^{-3} \text{ [mm]}.$$

This satisfies the conditional expressions (4) and (5).

It is known from this that in the first embodiment, the image quality is hardly to deteriorate even when the height of the scanning line is fluctuated due to the mode hop.

Note that in the first embodiment, one diffracting surface is provided, but the number of the diffracting surface is not limited to one and may be two or more. In such a case, the principal ray may be positioned outside of the main scanning section of at least one diffracting surface (outside of the optical axis of the diffracting surface) in the sub-scanning section.

Besides, in the first embodiment, the imaging optical system 6 is configured by two lenses, but the number of lenses is not limited to two. For example, the imaging optical system 6 may be configured by a single lens or three lenses or more.

Second Embodiment

Figure 4:
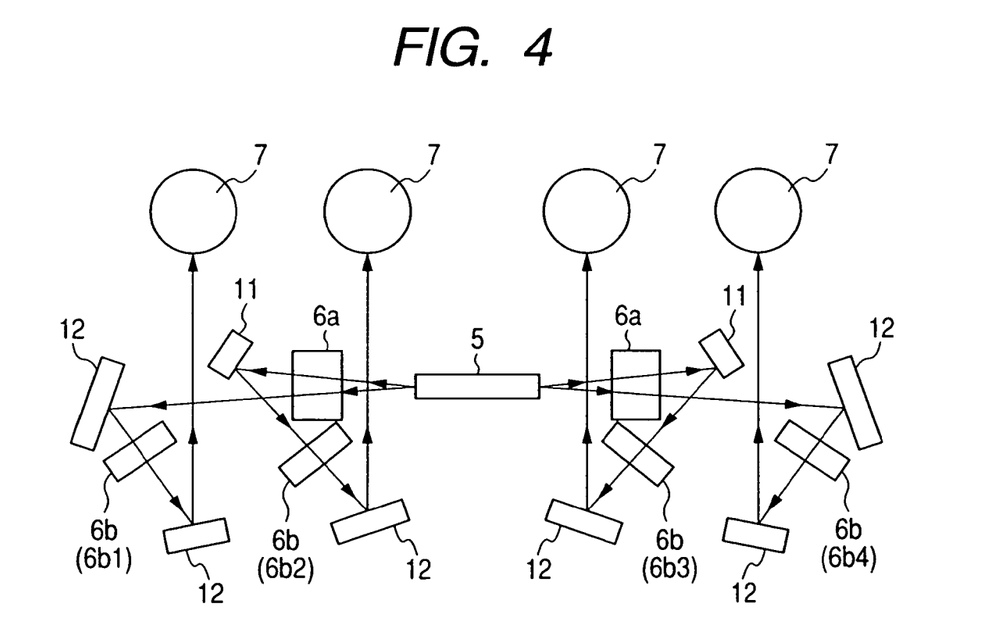
FIG. 4 is a sub-scanning sectional view of a second embodiment of the present invention.

FIG. 4 is a sub-scanning section of the optical system of an image forming apparatus according to a second embodiment of the present invention.

Figure 5:
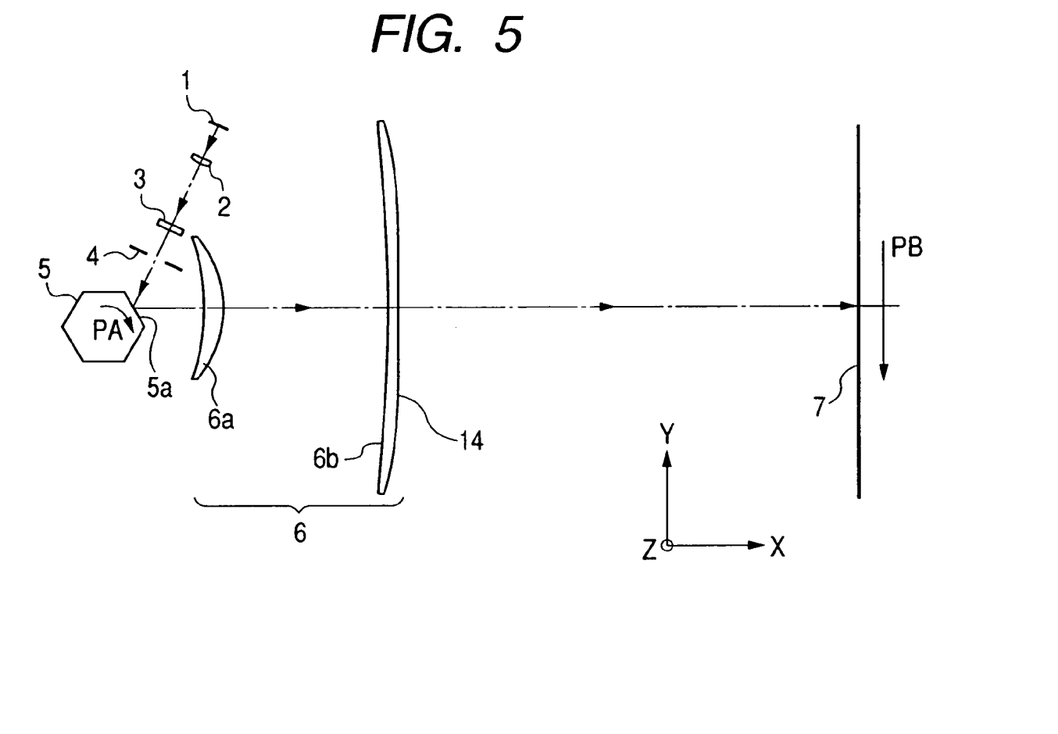
FIG. 5 is a main scanning sectional view of the second embodiment of the present invention.

FIG. 5 shows a state in which a light beam separating means 11, a fold mirror 12, and the like in FIG. 4 are omitted. In FIG. 5, specifically, four light beams are made incident on the light deflection device 5, but one arbitrary beam of the four light beams is taken as an example.

FIG. 5 is a main scanning sectional view showing the light scanning apparatus in which the one arbitrary light beam emitted from the light source means 1 sequentially passes through the collimator lens 2, the cylindrical lens 3, which has a power only in the sub-scanning direction, and the aperture stop 4, is deflected and reflected by the light deflection device (polygon mirror) 5, passes through the imaging optical system 6, and then reaches the surface to be scanned 7.

In FIGS. 4 and 5, the same elements as those shown in FIG. 1 are provided with the same reference numerals and symbols.

The second embodiment is different from the first embodiment as described above especially in following points. That is, in the second embodiment, four surfaces to be scanned (the photoconductive drum surfaces) 7 are provided (that is, the scanning unit is provided with four light scanning apparatuses as shown in FIG. 5). However, the light deflection device 5 is shared.

In other words, the second embodiment provides a four-station type image forming apparatus.

Further, the second embodiment is different from the first embodiment in a point that each of the light beams is made incident on the same light deflection device 5 with an angle of ±2° in a vertical direction of FIG. 4, the light beams after being deflected by the light deflection device 5 are separated by the light beam separating means (the fold mirror) 11, and after that, each of the separated beams is guided onto each corresponding surface to be scanned 7 via each corresponding fold mirror 12, as shown in FIG. 4.

Figure 6:
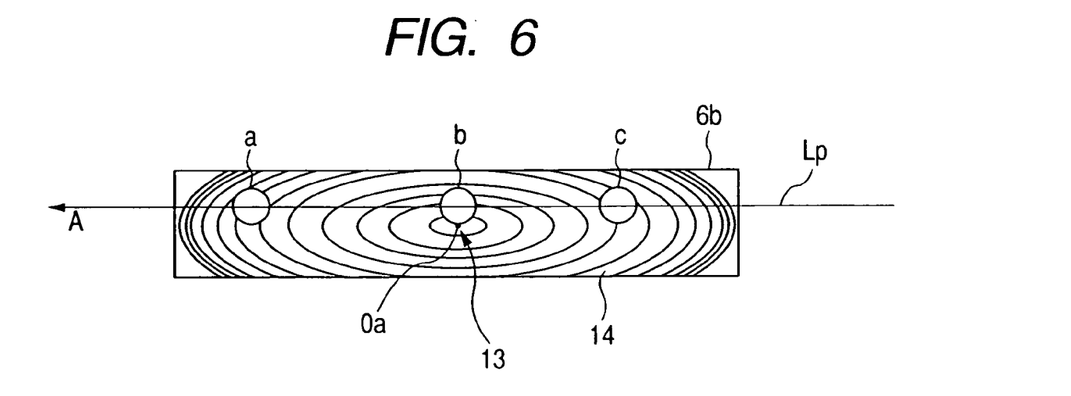
FIG. 6 is a view showing a positional relationship between a diffracting surface and a light beam according to the second embodiment of the present invention.

In addition, in the second embodiment, as shown in FIG. 6, the principal ray Lp that passes through the second imaging optical element 6b in the sub-scanning section passes through the inside of the zeroth zone section 13 of the diffracting surface 14.

However, as shown in FIG. 6, the principal ray Lp that passes through the second imaging optical element 6b in the sub-scanning section passes through the outside of the optical axis of the diffracting surface 14.

Other configurations and optical effects are substantially the same as those of the first embodiment, and thereby the same effects as those of the first embodiment are obtained.

In other words, in this embodiment, just as in the first embodiment described above, the diffracting surface 14 is provided, by injection molding, on the lens surface on the side of the surface to be scanned 7 of the second imaging optical element 6b that configures the imaging optical system 6.

The second imaging optical element 6b is a molded lens.

FIG. 6 is an explanatory view showing a positional relationship between the diffracting surface 14 and the light beam when the second imaging optical element 6b is viewed from the side of the surface to be scanned 7, as FIG. 3 described above. In FIG. 6, the same elements as those shown in FIG. 3 are provided with the same reference numerals and symbols.

In the second embodiment, as shown in FIG. 6, each of the light beams on the diffracting surface 14 is deviated by ±2.1 mm in a vertical direction of FIG. 6.

In other words, the height h of the ray is expressed by an expression of h=±2.1 mm. This is intended to correct a scanning line curvature and the like caused by the incidence of the light beam with an angle of ±2° with respect to the deflecting surface 5a of the light deflection device 5.

Note that FIG. 6 shows a case where the height h of the ray is expressed by an expression of h=±2.1 mm. In addition, the principal ray Lp passes through the outside of the zeroth zone section 13 of the diffracting surface 14. Further, the principal ray Lp passes through a position at which the height h of the ray is expressed by an expression of h=2.1 mm with respect to the second imaging optical elements 6b (6b2 and 6b3), and the principal ray Lp passes through a position at which the height h of the ray is expressed by an expression of h=−2.1 mm with respect to the second imaging optical elements 6b (6b1 and 6b4).

In the light scanning apparatus according to the first embodiment, the wavelength λ of the light beam is expressed by an expression $$\lambda=780\times10^{-6} \text{ [mm]},$$

the refractive index n of the lens material of each of the first imaging optical element 6a and the second imaging optical element 6b that configure the imaging optical system 6 is expressed by an expression $$n=1.5242,$$

the sensitivity dλ/dT and dn/dT of the wavelength λ and the refractive index n with respect to a temperature are expressed by expressions $$d\lambda/dT=0.255\times10^{-6} \text{ [mm/}^\circ\text{ C.]}, \text{ and}$$

$$dn/dT=-0.85\times10^{-4} \text{ [/}^\circ\text{ C.]},$$

respectively, the transversal magnification ratio β of the imaging optical system 6 in the sub-scanning direction is expressed by an expression $$\beta=-1.8,$$

and the resolution R is expressed by an expression $$R=1200 \text{ [dot/inch]}.$$

In addition, in this embodiment, temperature compensation is carried out with respect to the sub-scanning section, as in the first embodiment. In other words, in this embodiment, each element is set so as to satisfy the conditional expression (3) as described above. Note that in this embodiment, $$\phi a/\phi d=3.016.$$

This satisfies the conditional expression (3).

In the second embodiment, the ratio δδf/f of the focal length f of the imaging optical system 6 in the sub-scanning section to the amount of fluctuation of the focal length f, which is denoted by δδf, when the wavelength is fluctuated by +1 nm is, as described above, expressed by the expression $$\delta f/f=-4.251\times10^{-4}.$$

In the second embodiment, the displacement x of the height of the scanning line when the wavelength is fluctuated by 1 nm by the mode hop is expressed by an expression $$x=(1-\beta)\cdot(\delta f/f)\cdot h=-2.50\times10^{-3} \text{ [mm]}.$$

That is, $$|-2.50\times10^{-3} \text{ [mm]}|<\{25.4/R\}/2=21.1\times10^{-3} \text{ [mm]}.$$

This satisfies the conditional expression (1) and the conditional expression (2) described above.

In a case where a plurality of the surfaces to be scanned is scanned, a color drift (color registration failure) occurs instead of errors in the scanning line interval. However, in any cases, when a plurality of the light beams is scanned at the same time, it is necessary to control the displacement of the height of the scanning line more strictly than in the case where a single light beam is scanned.

In this regard, in this embodiment, each element is set so as to satisfy the above conditional expressions (4) and (5), in order to limit the displacement x of the height of the scanning line occurring due to the mode hop to be equal to or smaller than one-quarter of the scanning line interval.

More specifically, the scanning line interval d is, according to the expression $$R=1200 \text{ [dot/inch]},$$

expressed by an expression $$d=25.4/R=21.2\times10^{-3} \text{ [mm]}.$$

In this embodiment, the displacement x of the height of the scanning line when the wavelength is fluctuated by 1 nm due to the mode hop is, from the above expressions, expressed by an expression $$x=(1-\beta)\cdot(\delta f/f)\cdot h=-2.50\times10^{-3} \text{ [mm]}.$$

That is, $$|-2.50\times10^{-3} \text{ [mm]}|<\{25.4/R\}/4=5.3\times10^{-3} \text{ [mm]}.$$

This satisfies the conditional expressions (4) and (5).

It is known from this that in the first embodiment, the image quality is hardly to deteriorate even when the height of the scanning line is fluctuated due to the mode hop.

In the first embodiment, the resolution is set to be 600 dpi, and on the other hand, the resolution is set to be 1,200 dpi in the second embodiment. In this regard, the problem to be solved by the present invention becomes more remarkable as the resolution becomes higher. Therefore, the present invention is further effective in the light scanning apparatus having the resolution of 1,200 dpi or higher. In addition, the conditional expressions (1) through (5) of the present invention are further effective in a case where the resolution is 1,200 dpi or higher.

[Image Forming Apparatus]

Figure 7:
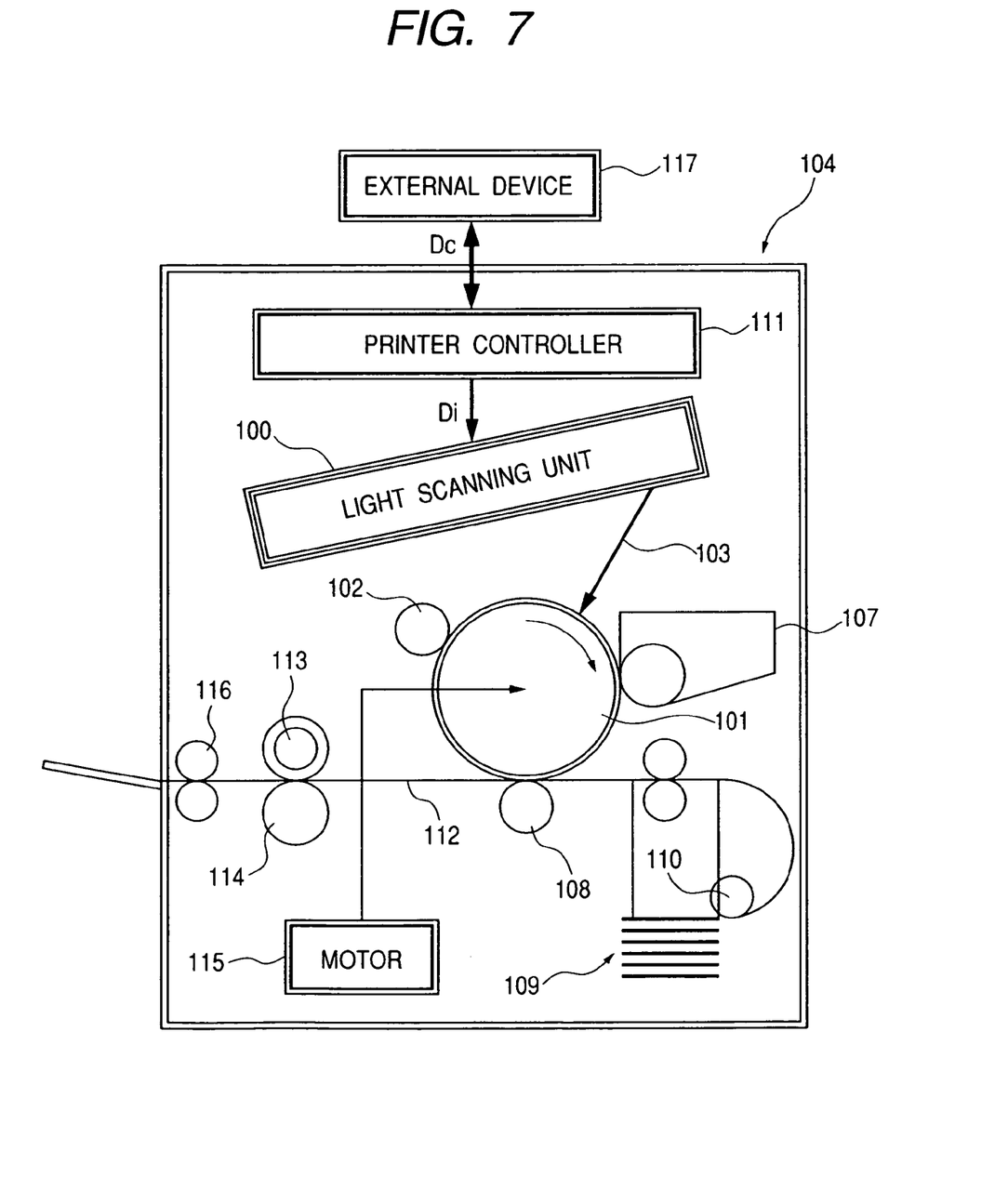
FIG. 7 is a sub-scanning sectional view showing an embodiment of an image forming apparatus of the present invention.

FIG. 7 is a main portion sectional view that shows an embodiment of the image forming apparatus of the present invention. In FIG. 7, reference numeral 104 denotes the image forming apparatus.

Code data Dc is inputted to the image forming apparatus 104 from an external device 117 such as a personal computer. The code data Dc is converted into image data (dot data) Di by a printer controller 111 in the image forming apparatus.

The image data Di is inputted to a light scanning unit 100 having the configuration as shown in the first embodiment.

In addition, a light beam 103 modulated in accordance with the image data Di is emitted from the light scanning unit 100, and a photosensitive surface of a photoconductive drum 101 is scanned in the main scanning direction by the light beam 103.

The photoconductive drum 101 that is an electrostatic latent image carrier (photosensitive member) is rotated clockwise by a motor 115.

Besides, along with the rotation, the photosensitive surface of the photoconductive drum 101 is moved into the sub-scanning direction orthogonal to the main scanning direction with respect to the light beam 103.

Above the photoconductive drum 101, a charging roller 102 for evenly charging the surface of the photoconductive drum 101 is provided so as to be brought into contact with the surface of the photoconductive drum 101.

In addition, the light beam 103 scanned by the light scanning unit 100 is irradiated on the surface of the photoconductive drum 101 charged by the charging roller 102.

As explained above, the light beam 103 is modulated on the basis of the image data Di, and an electrostatic latent image is formed on the surface of the photoconductive drum 101 by irradiating the beam 103.

The electrostatic latent image is developed as a toner image by a developing device 107 disposed so as to be brought into contact with the photoconductive drum 101 at a further downstream side of an irradiation position of the light beam 103 in the direction of rotation of the photoconductive drum 101.

The toner image developed by the developing device 107 is transferred on a paper sheet 112 that is a material to be transferred below the photoconductive drum 101 by a transferring roller 108 disposed so as to oppose to the photoconductive drum 101.

The paper sheet 112 is stored in a paper cassette 109 at the front of the photoconductive drum 101 (right side in FIG. 7), but it is also possible to manually feed the paper sheet.

At an edge portion of the paper cassette 109, a sheet feed roller 110 is disposed. The sheet feed roller 110 feeds the paper sheet 112 in the paper cassette 109 into a conveyance path.

In the manner as described above, the paper sheet 112 on which an unfixed toner image is transferred is further conveyed to a fixing device at the back of the photoconductive drum 101 (left side in FIG. 7).

The fixing device is configured by a fixing roller 113 having a fixing heater (not shown) inside thereof and a pressure roller 114 disposed so as to come into pressure contact with the fixing roller 113.

The unfixed toner image on the paper sheet 112 is fixed by applying pressure and heat to the paper sheet 112 conveyed from a transferring portion at a pressure contact portion of the fixing roller 113 and the pressure roller 114.

Further, at the back of the fixing roller 113, a delivery roller 116 is disposed. The delivery roller 116 delivers the paper sheet 112 on which the image is fixed to the outside of the image forming apparatus.

Although not shown in FIG. 7, the print controller 111 carries out a control of each portion of the image forming apparatus, such as the motor 115, and a polygon motor in the light scanning unit to be described below, as well as conversion of the data as explained above.

A recording density of the image forming apparatus used in the present invention is not especially limited to any value. However, considering that higher image quality is demanded as the recording density becomes higher, the configuration of the first embodiment of the present invention is further effective in the image forming apparatus having the recording density of 1,200 dpi or higher.

[Color Image Forming Apparatus]

Figure 8:
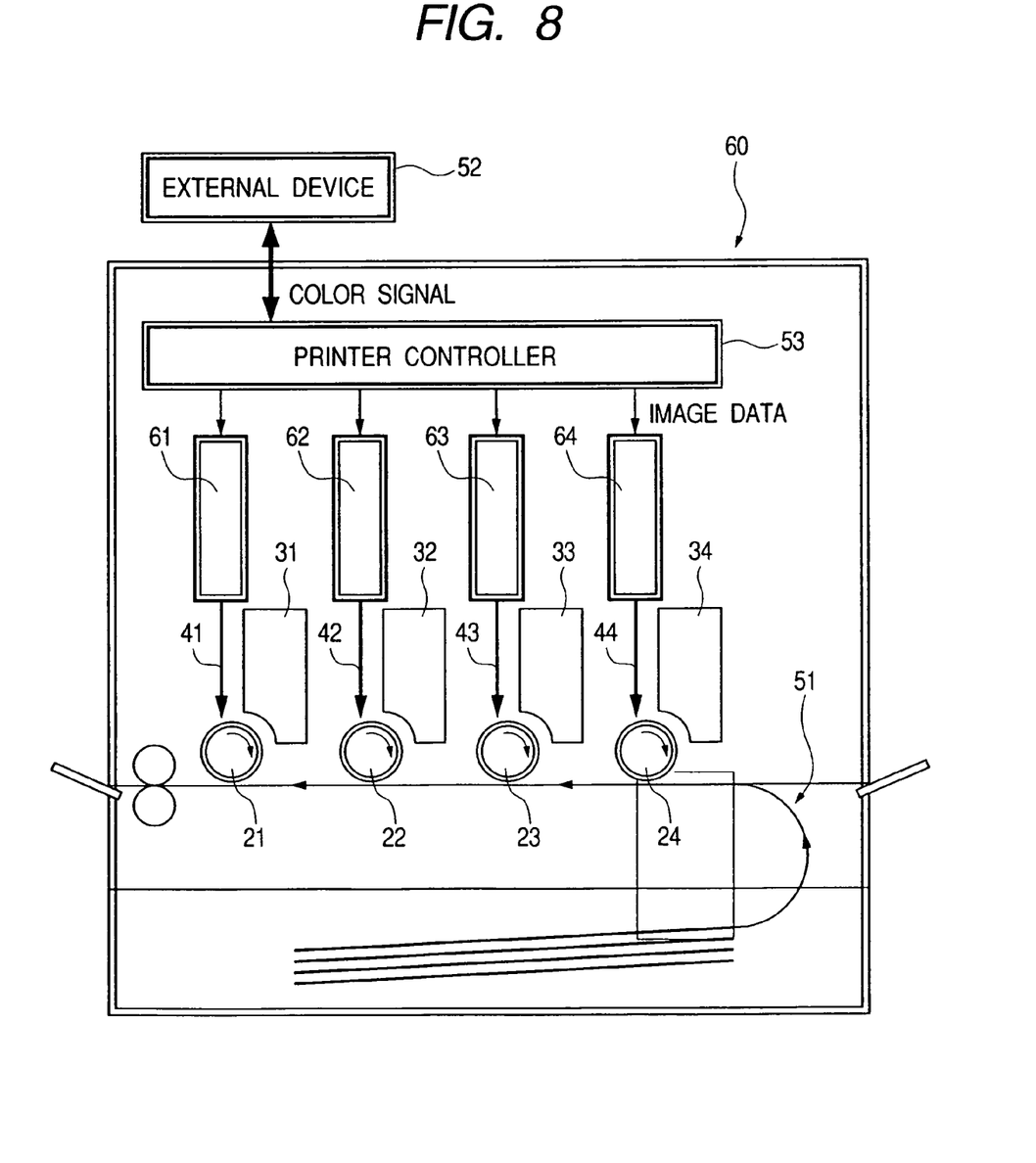
FIG. 8 is an outline view of an essential portion of a color image forming apparatus of the embodiment of the present invention.

FIG. 8 is a schematic diagram of a main portion of a color image forming apparatus according to this embodiment of the present invention. This embodiment provides a tandem type color image forming apparatus in which four light scanning apparatuses are disposed and recording of image information is collaterally carried out by the four light scanning apparatuses on the surface of the photoconductive drum that is an image carrier.

In FIG. 8, reference numeral 60 denotes the color image forming apparatus; reference numerals 61, 62, 63, and 64 respectively denote the light scanning apparatus having the configuration as shown in the first embodiment; reference numerals 21, 22, 23, and 24 respectively denote the photoconductive drum which is the image carrier; and reference numerals 31, 32, 33, and 34 respectively denote the developing device; and reference numeral 51 denotes a conveyor belt.

In FIG. 8, a signal of each colors of R (red), G (green), B (blue) is inputted to the color image forming apparatus 60 from the external device 52 such as the personal computer.

The color signals are converted into each image data (dot data) of C (cyan), M (magenta), Y (yellow), and B (black) by a printer controller 53 in the color image forming apparatus 60.

Each of the image data is inputted to the light scanning apparatuses 61, 62, 63, and 64, respectively.

Besides, light beams 41, 42, 43, and 44 modulated based on each image data are emitted from the light scanning apparatus, and the photosensitive surface of the photoconductive drums 21, 22, 23, and 24 is scanned in the main scanning direction by the light beams 41, 42, 43, and 44.

In the color image forming apparatus in this embodiment, four light scanning apparatuses (61, 62, 63, and 64) are disposed, and each of the light scanning apparatuses corresponds to each colors of C (cyan), M (magenta), Y (yellow), and B (black). Each of the light scanning apparatuses (61, 62, 63, and 64) collaterally records the image signal (image information) on the surfaces of the photoconductive drums 21, 22, 23, and 24 to print the color image at a high speed.

As described above, in the color image forming apparatus of this embodiment, the latent image of each color is formed on the surfaces of the photoconductive drums 21, 22, 23, and 24 corresponding to each color by using the light beam based on each image data by means of the four light scanning apparatuses 61, 62, 63, and 64. After that, one full-color image is formed by multiple transfer of the image on a recording material.

As the external device 52, a color image reading apparatus having a CCD sensor, for example, may be used. In this case, a color digital copying machine is configured by the color image reading apparatus and the color image forming apparatus 60.

This application claims priority from Japanese Patent Application No. 2004-318198 filed Nov. 1, 2004, which is hereby incorporated by reference herein.

What is claimed is:

1. A light scanning apparatus comprising:
an incidence optical system for guiding a light beam emitted from a light source means to a deflection means; and
an imaging optical system for guiding the light beam reflected on the deflection means on a surface to be scanned, which has at least one diffracting surface having a power in a sub-scanning section;
wherein the deflecting surface of the deflection means and the surface to be scanned are conjugated with each other;
wherein in the sub-scanning section, a principal ray of the light beam reflected by the deflection means passes through an outside of an optical axis of the diffracting surface; and
wherein, letting β be a transversal magnification ratio of the imaging optical system in the sub-scanning section, f [mm] be a focal length of the imaging optical system in the sub-scanning section, δf [mm] be an amount of variance of the focal length of the imaging optical system in the sub-scanning section when a wavelength of the light beam emitted from the light source means is varied by 1 nm, h [mm] be a distance between the principal ray and the optical axis of the diffracting surface in the sub-scanning section on the diffracting surface, and R [dot/inch] be a resolution, a following condition is satisfied:

$$|(1-\beta) \cdot (\delta f/f) \cdot h| < \{25.4/R\}/2, |h| > 0.$$

2. A light scanning apparatus according to claim 1, wherein, letting φa [1/mm] be a total power of the imaging optical system in the sub-scanning section, and φd [1/mm] be a power of the diffracting surface in the sub-scanning section generated by diffraction, a following condition is satisfied:

$$2.0 < \phi a/\phi d < 4.0.$$

3. A light scanning apparatus according to claim 1, wherein the light source means comprises:

a plurality of light emitting sections, wherein when the surface to be scanned is scanned by a plurality of the light beams emitted from a plurality of the light emitting sections, a following condition is satisfied:

$|(1-\beta)\cdot(\delta f/f)\cdot h|<\{25.4/R\}/4.$

4. A light scanning apparatus comprising:

an incidence optical system for guiding a light beam emitted from a light source means to a deflection means; and an imaging optical system having one or more imaging optical elements which guides the light beam deflected by the deflection means onto a surface to be scanned;

wherein the deflecting surface of the deflection means and the surface to be scanned are conjugated with each other;

wherein the imaging optical element whose power is strongest in the sub-scanning section, of one or more imaging optical elements, has a diffracting surface having a power in the sub-scanning section;

wherein in the sub-scanning section, a principal ray of the light beam reflected by the deflection means passes through an outside of an optical axis of the diffracting surface; and wherein, letting β be a transversal magnification ratio of the imaging optical system in the sub-scanning section, h [mm] be a distance between the principal ray and the optical axis of the diffracting surface in the sub-scanning section on the diffracting surface, R [dot/inch] be a resolution, φa [1/mm] be a total power of the imaging optical system in the sub-scanning section, and φd [1/mm] be a power of the deflecting surface in the sub-scanning section generated by diffraction, following conditions are satisfied:

$4.251\times10^{-4}\times|(1-\beta)\cdot h|<\{25.4/R\}/2,\ |h|>0,\ 2.0<\phi a/\phi d<4.0.$ 5. A light scanning apparatus according to claim 4, wherein the light source means comprises:

a plurality of light emitting sections, wherein when the surface to be scanned is scanned by a plurality of the light beams emitted from a plurality of the light emitting sections, a following condition is satisfied:

$4.251\times10^{-4}\times|(1-\beta)\cdot h|<\{25.4/R\}/2,\ |h|>0.$

6. A light scanning apparatus according to claim 1, wherein the principal ray passing through the imaging optical system passes through an outside of a zeroth zone section of the diffracting surface.

7. A light scanning apparatus according to claim 4, wherein the principal ray passing through the imaging optical system passes through the outside of the zeroth zone section of the diffracting surface.

8. An image forming apparatus comprising:

the light scanning apparatus according to claim 1 or 4;

a photosensitive member disposed on the surface to be scanned;

a developing device for developing an electrostatic latent image formed on the photosensitive member by a light beam scanned by the light scanning apparatus as a toner image;

a transferring device for transferring the developed toner image on a material to be transferred; and a fixing device for fixing the transferred toner image onto the material to be transferred.

9. An image forming apparatus comprising:

the light scanning apparatus according to claim 8; and a printer controller for converting code data inputted from an external device into an image signal and inputting the converted code data to the light scanning apparatus.

10. A color image forming apparatus comprising:

a plurality of image bearing members each of which is disposed on a surface to be scanned of the light scanning apparatus according to claim 1 or 4 and which forms images of colors different from each other.

11. A color image forming apparatus according to claim 10, further comprising:

a printer controller for converting a color signal inputted from the external device into image data of different colors and inputting the converted image data into each light scanning apparatus.

* * * * *